United States Patent [19]
Weber

[11] 3,863,909
[45] Feb. 4, 1975

[54] MULTI-TUBULAR SPRINGS

[75] Inventor: Milton N. Weber, Dearborn, Mich.

[73] Assignee: Barry Wright Corporation,
Watertown, Mass.

[22] Filed: July 9, 1973

[21] Appl. No.: 377,243

[52] U.S. Cl.................................. 267/140, 293/60
[51] Int. Cl.............................................. F16f 7/12
[58] Field of Search........... 267/139, 140, 141, 181,
267/152, 153; 293/60; 188/16; 206/521

[56] References Cited
UNITED STATES PATENTS

| | | | |
|---|---|---|---|
| 3,672,657 | 6/1972 | Walker et al. | 293/60 |
| 3,674,115 | 7/1972 | Walker et al. | 293/60 |
| 3,680,662 | 8/1972 | Walker et al. | 293/60 |

*Primary Examiner*—James B. Marbert
*Attorney, Agent, or Firm*—Milton E. Gilbert

[57] ABSTRACT

A spring comprising a plurality of tubular elements formed of a resilient material, and arranged in groups in parallel planes. The groups and the members of each group are bonded together so that the latter are in integral and load transmitting relation with each other.

18 Claims, 10 Drawing Figures

MULTI-TUBULAR SPRINGS

This invention relates to resilient compressible systems, and more particularaly to novel spring units suitable for use as shock mounts and vibration isolators.

Conventional metal coil or helical springs designed for compresion loading are limited in their capability to function as shock mounts and vibration isolators and generally cannot adequately accommodate sudden load surges or provide adequate damping. In an effort to overcome these and other deficiencies, the art has turned to using bodies of natural or synthetic elastomers, e.g., rubber, and polymers and copolymers of ethylene, styrene, urethane and the like. While springs formed from elastomeric bodies may provide some improvement over metal springs, such spring tend to lack horizontal or transverse stability when they consist of a plurality of resilient elements arranged so as to work in series under an applied vertical load. Furthermore, areas within such springs may not be uniformly stressed, e.g., internal areas may be under comparatively greater compression or stress than other areas. As a result, the useful life of such springs may be relatively short.

Gallagher U.S. Pat. No. 3,515,382 proposes forming a compression spring from a plurality of like dimensioned toroids made from a hard elastomer. The toroids are stacked one upon the other, separated from one another by rigid, flat annular plates. The Gallagher device is said to provide improved compressive stress performance under heavy loads. However, such system has a disadvantage in that means must be provided to constrain the toroids against lateral displacement. Also, areas of the compressible elements, i.e., in the toroids, may be under comparatively greater compression or stress than other areas.

Azoini British Pat. No. 641316 proposes forming a spring structure from a plurality of rubber elements, each of which has internal or external cavities or grooves. The elements are arranged in arrays and stacked one upon the other, with rigid metal discs separating the arrays. A disadvantage of the Azoini system is the requirement for separating discs which increases manufacturing costs. The same disadvantage characterizes the rubber spring shown in U.S. Pat. No. 2,699,934, issued Jan. 18, 1955 to A. Boschi for Rubber Spring.

Accordingly, an object of the present invention is to provide a simple, practical and economical spring device which overcomes the aforementioned problems and other problems known to persons skilled in the art.

Another object of the present invention is to provide a novel spring device that can be readily and economically tailored to achieve a desired load deflection characteristic.

A further object is to provide a spring for low load/deflection requirements using materials with a relatively high modulus of elasticity that can be formed by conventional plastic molding and extruding techniques.

Another object is to provide a novel spring device for use as a vibration isolator and as a shock mount.

Still another object is to produce springs made from resilient solid plastic material that are competitive in price with metal springs and cellular foam.

A more specific object is to provide a spring capable or dissipating heat build-up, particularly when operating at high frequency, high amplitude loads.

Another specific object is to provide a spring construction that utilizes a spring element which permits production of springs in a variety of load ranges and physical dimensions.

The foregoing and other objects of the invention are achieved by a spring assembly comprising a plurality of tubular elements formed of a resilient material. The elements are arranged in groups in parallel planes, and the groups and the members of each group are bonded together so that the latter are in integral and load transmitting relation with each other. In a preferred embodiment, the elements are adapted to receive an insert to vary the load deflection characteristics.

Other features and many of the attendant advantages of the invention are described or rendered obvious by the following detailed description which is to be considered together with the accompanying drawings wherein.

In the drawings, like numerals designate like parts.

Figure 1:
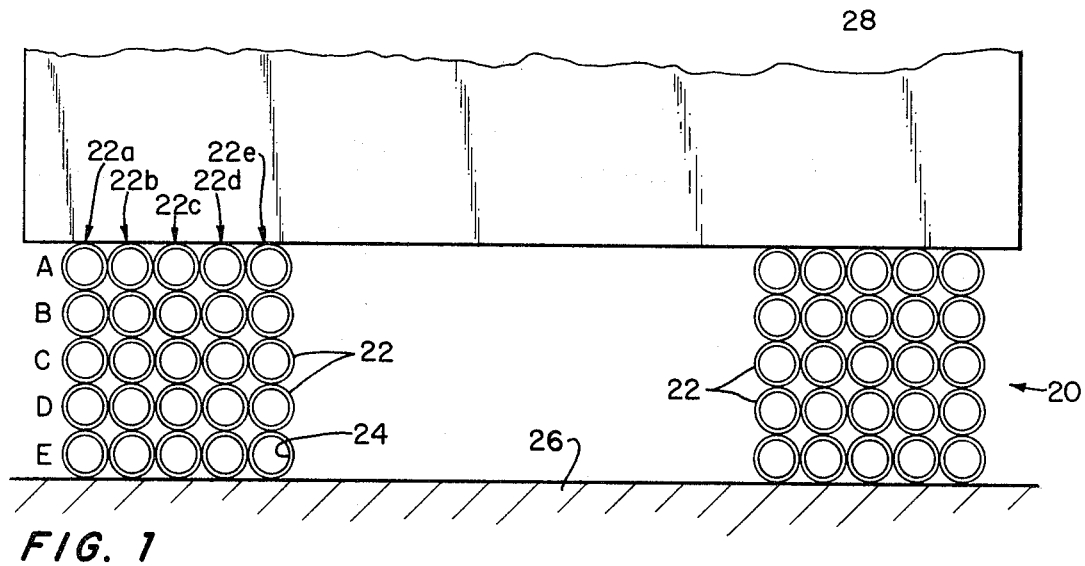
FIG. 1 shows a side elevational view illustrating a load supported by a pair of spring units constituting one embodiment of the invention.

Referring first to FIG. 1, there is shown two spring assemblies arranged to support a load 28 above a base 26 (which may be a floor or the like) and the act as vibration isolators. Each assembly 20 comprises a plurality of elongated like tubular elements 22 of generally circular cross-section having a relatively thin cylindrical wall 24.

The elements 22 are formed of an elastomeric material, e.g., typically a naturally occurring or a synthetic polymeric material which is resiliently deformable. Elements 22 may be formed of natural or synthetic rubber or polymers or copolymers of ethylene, propylene, styrene, urethane and the like, e.g., polyvinyl chloride, polyethylene, polypropylene, polyacrylic resins, and acrylonitrile-butadiene-styrene copolymers. Still other resilient polymeric materials known to persons skilled in the art may be used. For a load-bearing application as shown in FIG. 1, the elements 22 may be made of a material having a relatively high modulus of elasticity, e.g., polyurethane having a Shore-A hardness of 90.

The elements 22 are arranged in groups of parallel planes; that is to say, the axes of elements 22 are arranged in parallel planes. More specifically, elements 22 are arranged in groups in five planes A, B, C, D and E, with each group consisting of five elements 22a, 22b, 22c, 22d and 22e. The members of each group are bonded together and to the corresponding members of the adjacent groups or groups so as to form an integral assembly. Thus element 22b in plane B is bonded to elements 22a and 22c in plane B and also to elements 22b in planes A and C. The elements may be bonded together by a suitable cement or fused or welded together. Alternatively, a group of elements 22 may be integrally formed, i.e., as by extrusion techniques well known in the art.

In the arrangement of FIG. 1, the assemblies 20 have essentially a square configuration and thus their upper and lower sides engage the base 26 and the load 28 over relatively wide areas and coact to provide lateral stability. Because elements 22 have a cylindrical shape, are made of a material having a relatively high modulus of elasticity, and are bonded together, the assemblies 20 have relatively high rigidity along both horizontal axes and flexibility along the vertical axis.

Spring assemblies 20, like the other modification hereinafter described, offer the advantage that their spring rate or stiffness and their damping characteristics can be modified as required by varying one or more of the following: (a) the type of material used to form elements 22, (b) the hardness of such material, (c) the wall thickness of elements 22, (d) the diameter of elements 22, and (e) length and number of elements 22. The springs 22 also offer the advantages of relatively low cost and a relatively large capability to dissipate heat due to the open spaces between the elements which facilitate circulation of cooling air. The construction permits tailoring to achieve a predetermined load-deflection characteristic.

A further advantage of springs constructed in accordance with this invention is that they can be provided with various forms of mounting plates for facilitating attachment. This aspect of the invention is illustrated in FIG. 2.

Figure 2:
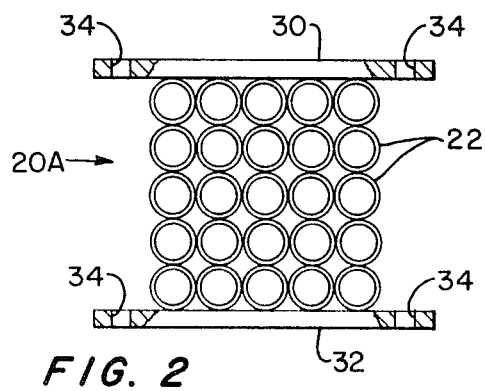
FIG. 2 shows a side elevation, partly in section, of another embodiment of the invention.

FIG. 2 shows an assembly 20A like the assemblies 20 of FIG. 1. However, in FIG. 2 the groups of elements at the upper and lower ends of the assembly, i.e., groups A and E, are bonded to a pair of rigid mounting plates 30 and 32. Plates 30 and 32 are provided with holes 34 for accommodating means such as screws or bolts (not shown) for securing the assembly at one end to a support, and at the other end to a machine or the like (not shown) which is to be supported.

Another advantage of the invention is that the spring characteristic along one or more of its axes may be changed by suitably arranging the tubular elements. Thus for example, in the embodiment shown in FIG. 3, the assembly 20B consists of the same number of groups of elements A, B, C, D and E but arranged so that member elements in one group extend at a right angle to members of the adjacent group or groups. Thus the elements of group B extend at a right angle to the elements in the adjacent groups A and C. As in the embodiments shown in FIGS. 1 and 2, the groups are arranged in parallel planes relative to each other, and the groups and members of each group are bonded together so that the latter are in integral and load transmitting relation with each other. Notwithstanding that it consists of the same number of elements, this embodiment has a different horizontal stiffness than the assemblies 20 and 20A of FIGS. 1 and 2. The vertical stiffness is substantially the same in all three cases.

Figure 3:
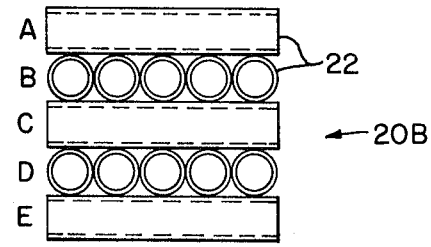
FIGS. 3–5 illustrate side elevation views of still another embodiments of the invention.
Figure 4:
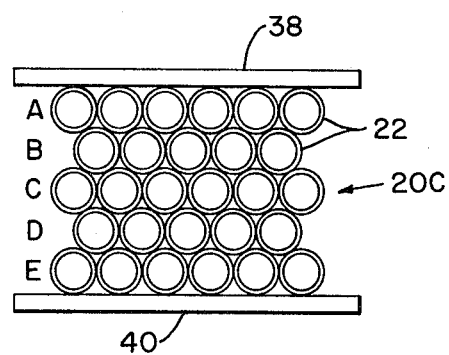

Still another embodiment 20C of the invention is shown in FIG. 4. In this case, the elements 22 are arranged so that every other row consists of a first number of elements and the other rows consist of a second different number of elements. Thus, groups A, C and E each have 6 elements 22 and groups B and D each consist of 5 elements. The groups are arranged in parallel planes as in the embodiment shown in FIGS. 1 and 2; however, in this case the groups are arranged in a staggered arrangement, i.e., each group is shifted laterally relative to the adjacent group or groups by a distance equal to the radius of a member 22. As a result, a number of the members in groups B, C and D are disposed so as to contact six adjacent elements. As in the embodiments of FIGS. 1–3, the members 22 are bonded together. The assembly may include end plates 38 and 40 respectively bonded to the upper and lower groups of elements. This arrangement has a different load-deflection characteristic than a symmetrical array employing the same number of identical elements.

Figure 5:
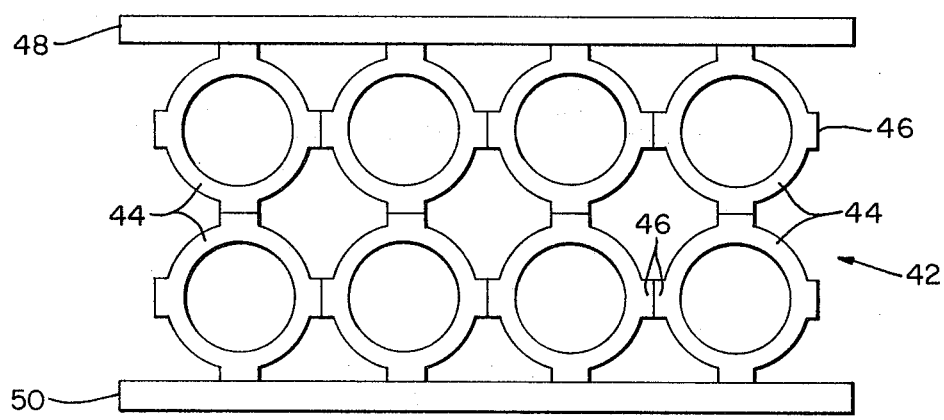

In the embodiment shown in FIG. 5, the illustrated spring unit 42 comprises a plurality of resilient elements 44 in the shape of elongated hollow tubular bodies having a generally circular cross-section. However, each element also includes a plurality of relatively flat longitudinally extending ribs 46 spaced evenly around the periphery of the elements. Ribs 46 are formed integrally with elements 44. The tubular elements 44 are arranged in groups of parallel planes with adjacent elements oriented with respect to one another so that ribs 46 of adjacent elements contact each other. The contacting ribs are bonded to one another. The spring unit may be bonded to mounting plates 48 and 50. It is to be appreciated that ribs 46 act as load-transmitting elements and that they affect the load-deflection characteristic of the spring unit. Ribs 46 may be made of a material with a different stiffness than that of the elements 42 and, for example, may be adapted to damp transmission of shock from one element to another.

Figure 6:
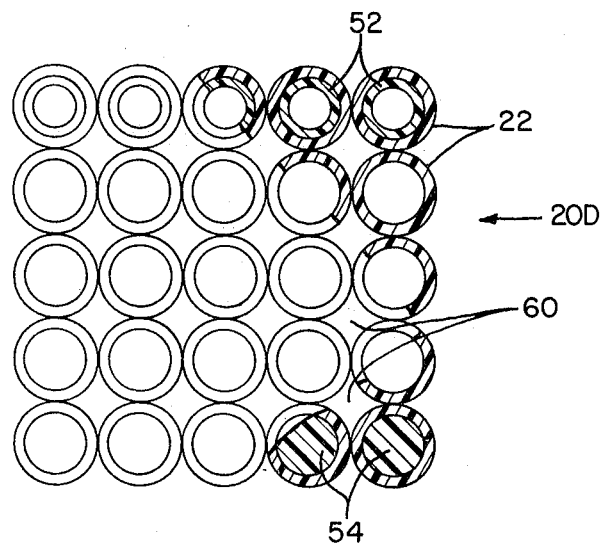
FIG. 6 shows a side elevation view of another and preferred embodiment of the invention.

FIG. 6 illustrates another important modification and advantage of the invention. In FIG. 6 the spring unit 20D is similar to the spring units 20 of FIG. 1 in that it comprises elements 22 arranged in five planar groups with each group consisting of five elements. However, some of the elements 22 are loaded with a hollow tubular element 52 while other elements 22 are loaded with solid elements 54. These added elements 52 and 54 function to modify the load deflection characteristics of the spring unit. In this connection it is to be noted that elements 52 and 54 may be elastomeric and formed of the same material as elements 22 or a different material. They may even be formed of a substantially rigid material such as a metal. Depending upon the load-deflection requirements, the inserts may be all tubular like elements 52 or all solid like elements 54, and only some or all of the elements 22 may have inserts. Preferably the inserts are sized to make a snug fit in elements 22, but they may be bonded to elements 22 by a suitable adhesive.

It is to be appreciated also that the interspaces 60 between the elements 22 may be loaded with a suitably shaped element (not shown) for further modifying the load-deflection characteristic of the assembly. Preferably, however, the interspaces 60 are left open to facilitate heat dissipation.

Figure 8:
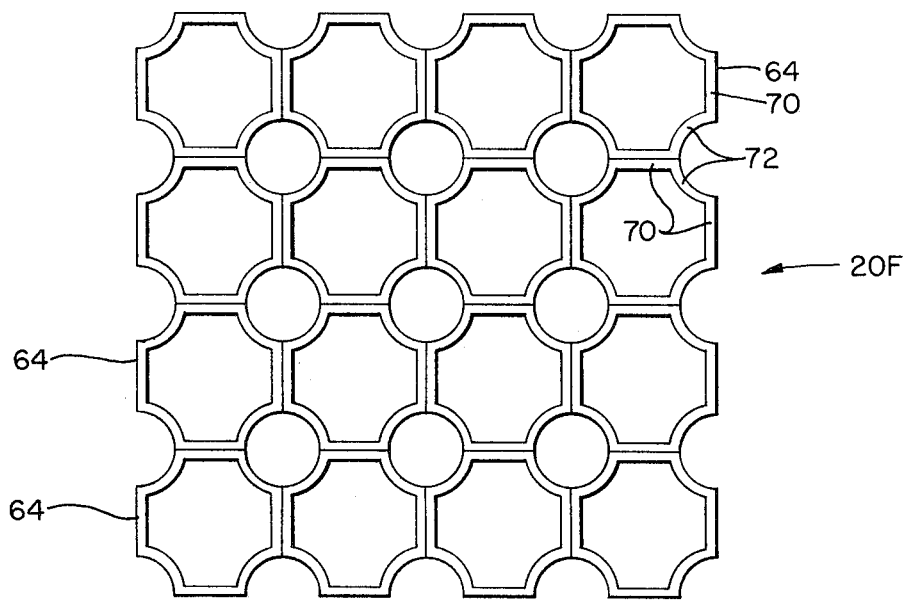
FIGS. 7–9 illustrate side elevation views of still other embodiments of the invention.
Figures 7, 9:
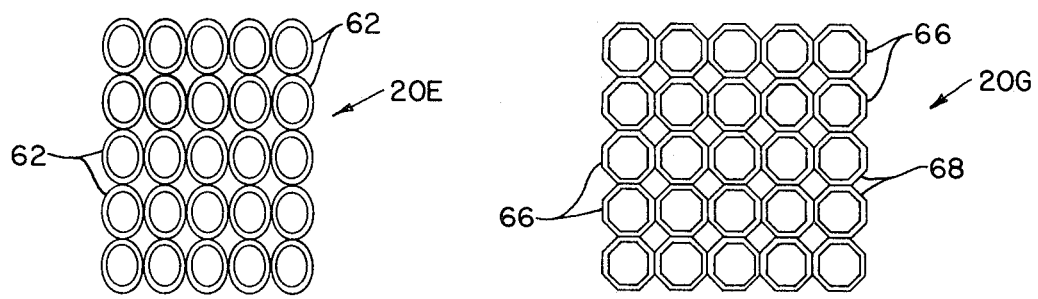

FIGS. 7–9 show still other embodiments of the invention. Thus for example, in FIG. 7 the spring unit 20E consists of tubular elements 62 that are made of a resiliently compressible material and have a substantially elliptical cross-section. In FIGS. 8 and 9, the springs 20F and 20G consist of resiliently compressible tubular elements 64 and 66 which are octogonal in cross-section, the latter comprising regular octogons consisting of eight flat sides 68 and the former comprising flat walls 70 alternating with concave walls 72. Springs 20E, 20F and 20G have different spring characteristics as a consequence of the differences in the cross-sectional shapes of the elements 62, 64 and 66. Of course, these spring units may be provided with mounting plates like spring units 20A and 20C. Also, their elements may be arranged as shown in FIG. 3.

Figure 10:
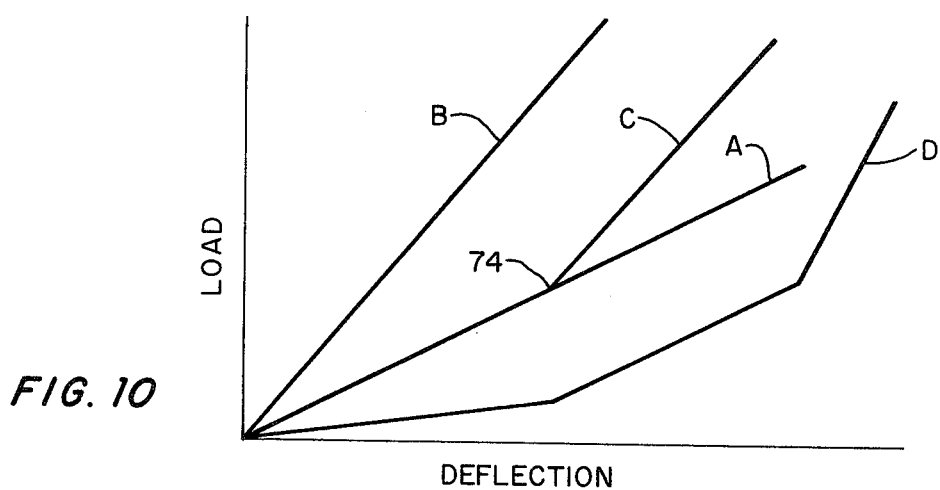
FIG. 10 is a diagram showing load deformation curves for typical embodiments of the present invention.

Persons skilled in the art will recognize that the tubular elements may have cross-sectional shapes other than those illustrated herein. Furthermore, the tubular elements can be arranged in configurations other than those shown herein. Also, the number of elements in each group and the number of groups may be varied over a wide range, as may the sizes and wall thicknesses of the elements and the hardness of the materials of which they are made. These variable factors make it possible to provide springs with characteristics that are tailored to meet specific load-deflection requirements. This advantage is demonstrated by the following examples which are to be considered together with FIG. 10.

EXAMPLE I

A spring assembly is made by bonding together a plurality of tubular elements in five horizontal groups of five member elements each as shown in FIG. 1 at 20. Each element comprises a short cylinder (1 ¾ inch long) having a circular cross-section with an inner diameter of one-fourth inch and an outer diameter of five-sixteenth inch. The cylinders are formed of a polyurethane material having a hardness of 90 as measured on the Shore A scale. Curve A shows deflection under various loads of this spring assembly.

EXAMPLE II

A second spring assembly is made as in Example I except that each element has a circular cross-section with an inner diameter of one-eigth inch and an outer diameter of one-fourth inch. Curve B shows deflection of this second spring assembly under various loads.

EXAMPLE III

A third spring assembly is made as in Example I except that a tubular element made of the same polyurethane material is inserted into each of the two upper horizontal groups of elements corresponding to Groups A and B of FIG. 1. These tubular inserts have the same length as the tubular elements of the spring assembly but have an inner diameter of about three-sixteenth inch and an outer diameter of about one-fourth inch. The load deflection characteristics of the spring as modified by the inserts is illustrated by Curve C. Below point 74, Curve C is substantially the same as Curve A.

EXAMPLE IV

A fourth spring assembly is made as in Example I, except (a) the elements are made of a polyethylene material having a Shore A hardness of about 75 and (b) the inner diameter of the elements in the topmost horizontal group is about one-eighth inch, the inner diameter of the elements in the second and third groups from the top have an inner diameter of about one-fourth inch, and the inner diameter of the elements in the bottom and next-to-bottom groups have an inner diameter of about six-sixteenth inch. All of the elements have an outer diameter of about seven-sixteenth inch. Curve D shows the load deflection characteristics of the spring assembly.

As previously noted, the spring construction of the present invention has an advantage in that it lends itself to especially simple manufacture from relatively inexpensive materials such as natural and synthetic polymeric materials. It will be seen from the foregoing that in addition to the advantage hereabove enumerated, the springs of the present invention are light weight, and can be made of materials that are resistant to oil and water. Thus they can be used to advantage in motor vehicles, e.g., as motor mounts and as shock absorbers for bumpers. Because they are able to dissipate heat buildup relatively quickly, the springs may operate under relatively high frequency and high amplituide loads without fatigue. Another important advantage is that the elements coact to provide lateral stability and hence additional means are not required to constrain the elements against relative lateral displacement. Furthermore, if the load requirements of an existing installation are increased, additional elements may be inserted in the manner shown in FIG. 6 to achieve appropriate spring stiffness. Finally, it will be apparent that the tubular elements can simply be sold in single lengths or in arrays, to be cut and bonded together in desired configuration by the ultimate user to meet a wide range of desired spring and damping specifications.

Since there are changes which may be made in the above apparatus without departing from the scope of the invention herein involved, it is intended that all matter contained in the above description shown in the accompanying drawings shall be interpreted as illustrative and not in a limiting sense.

What is claimed is:

1. A spring comprising a plurality of tubular spring elements arranged in groups in substantially parallel planes with each member of each group extending parallel to the other members of the same group, each of said spring elements being made of a resilient material so that it is capable of collapsing under a load applied transversely of its longitudinal axis and of automatically regaining its original cross-sectional configuration on removal of said load, and the members of each group engaging and being bonded to each other and also adjacent members of each adjacent group so as to form a totally integrated structure with said members in load-transmitting relation with each other.

2. A spring according to claim 1 wherein said tubular elements are open at their opposite ends.

3. A spring according to claim 2 wherein members of one groups are extended at an angle to members of another group.

4. A spring according to claim 1 wherein said elements are cylindrical tubes.

5. A spring according to claim 1 wherein said elements are elliptical tubes.

6. A spring according to claim 1 wherein at least some of said tubular elements are formed with struts and are bonded to each other along the lengths of said struts.

7. A spring according to claim 6 wherein said struts and said elements are formed of the same material.

8. A spring according to claim 1 wherein said elements are constructed so as to cause the load deformation of said spring to conform to a selected, predetermined relationship as the load on said spring is increased through its working range.

9. A spring according to claim 1 wherein said elements are constructed and disposed so that the load-deformation curve of said spring has a selected, predetermined shape.

10. A spring according to claim 1 wherein said plurality of tubular elements are formed integrally as one-piece.

11. A unitary spring structure for use as a load-bearing device comprising at least two parallel groups of tubular open-ended spring elements with each member of each group extending parallel to the other member of the same group, each of said elements being made of a resilient material so that said each element is capable of collapsing under a load applied transversely of its longitudinal axis and of automatically regaining its original cross-sectional configuration on removal of said load, at least some of the elements of each group being integrally joined with adjacent elements of the same group and adjacent groups, so as to form a totally integrated structure with said members in load-transmitting relation with each other.

12. A spring according to claim 1 comprising first and second mounting plates affixed to and embracing said elements.

13. A spring according to claim 1 wherein certain of said elements are made of a material having a stiffness different from the material of which others of said elements are made.

14. A spring according to claim 1 further including auxiliary resilient elements mounted within at least some of said tubular elements and coacting therewith to modify the load-deflection characteristic of said spring.

15. A spring according to claim 1 wherein said tubular elements have a polygonal shape in cross-section.

16. A spring according to claim 1 wherein said tubular elements are made of a polymerized material.

17. A spring according to claim 16 wherein said tubular elements have a durometer in the order of 90 on the Shore A hardness scale.

18. A spring according to claim 1 wherein the members of one group are in staggered relation to the members of an adjacent group.

* * * * *